United States Patent [19]
Mizuno et al.

[11] Patent Number: 5,131,506
[45] Date of Patent: Jul. 21, 1992

[54] DOOR CONTROL SYSTEM USING DRIVE MOTOR TORQUE SIGNALS

[75] Inventors: Masamoto Mizuno; Masanori Tawada; Terumi Hirabayashi; Toshiyuki Kodera, all of Inazawa, Japan

[73] Assignee: Mitsubishi Denki Kabushiki Kaisha, Japan

[21] Appl. No.: 651,981

[22] Filed: Feb. 7, 1991

[30] Foreign Application Priority Data

Feb. 16, 1990 [JP] Japan .................................. 2-33680

[51] Int. Cl.$^5$ ............................................. B66B 13/14
[52] U.S. Cl. .................................................... 187/103
[58] Field of Search ................ 187/103, 119; 318/721, 318/801

[56] References Cited

U.S. PATENT DOCUMENTS

| | | | |
|---|---|---|---|
| 3,814,214 | 6/1974 | Booker, Jr. | 187/103 |
| 4,051,419 | 9/1977 | Takahashi | 318/721 |
| 4,227,137 | 10/1980 | Hartman | 318/801 |
| 4,300,663 | 11/1981 | Hmelovsky et al. | 187/103 |
| 4,815,567 | 3/1989 | Ikejima | 187/119 |
| 4,982,816 | 1/1991 | Doi et al. | 187/119 |

Primary Examiner—A. D. Pellinen
Assistant Examiner—Lawrence Coubert
Attorney, Agent, or Firm—Leydig, Voit & Mayer

[57] ABSTRACT

A system for controlling operation of an elevator car door includes a torque command output device for outputting a torque command for controlling a car door driving motor on the basis of a difference between a speed command commanding the operating speed of the motor and the actual speed of operation of the motor, a door position detector for detecting the position of the car door in terms of the number of pulses in a pulse train produced by an encoder connected to the motor, and a memory for storing torque limit values as a function of the door position. The system also has a controller which reads the torque limit value corresponding to the car door position detected by the door position detector. The controller then compares the read torque limit value with a torque command output from the torque command output device and generates a reversing instruction to be given to the motor upon determining that the torque command is not smaller than the torque limit value. An obstruction of the door is sensed as a rise in the torque command so that the car door is reversed to ensure safety.

11 Claims, 6 Drawing Sheets

DOOR CONTROL SYSTEM USING DRIVE MOTOR TORQUE SIGNALS

BACKGROUND OF THE INVENTION

1. Field of the Invention

The present invention relates to a system for controlling the opening and closing operation of a car door of an elevator or lift, the system being capable of eliminating danger of a passenger being caught in the door.

2. Description of the Related Art

Figure 4:
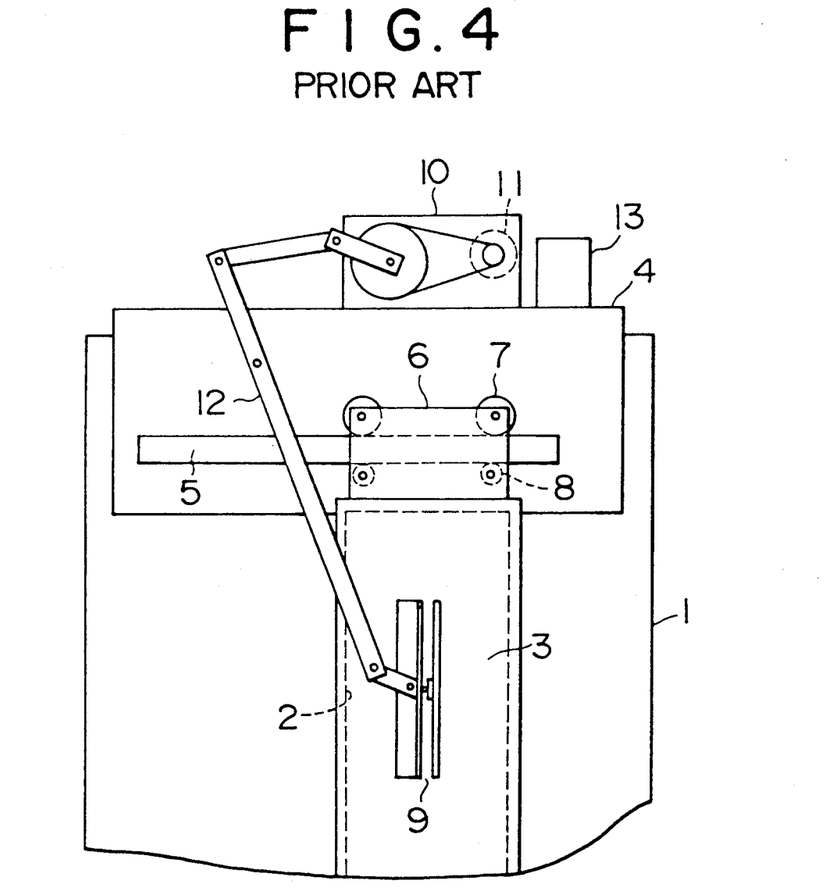
FIG. 4 is an illustration of the mechanical structure of a conventional elevator car door system.

FIG. 4 illustrates the mechanical construction of an elevator door system of the type disclosed in Japanese Patent Laid-Open No. 1-231794. Referring to this figure, the door system has a car door 3 provided on an entrance 2 of a car 1, a hanger case 4 provided on the top of the car 1, a rail 5 fixed to the hanger case 4, a door hanger 6 fixed to the upper end of the car door 3, and rollers 7, 8 provided on the top of the door hanger 6 and adapted for rolling along the upper and lower surfaces of the rail 5. Numeral 9 denotes an engaging device mounted on the door 3. When the car 1 is stopped in a door zone, the engaging device 9 engages with a device (not shown) provided on a landing door so as to link the car door 3 and the landing door. Numeral 10 denotes a driving unit mounted on the hanger case 4 and including an electric motor 11. The driving unit 10 is drivingly connected through a 4-link type connecting mechanism 12. The electric motor 11 is driven through an inverter 13.

Figure 5:
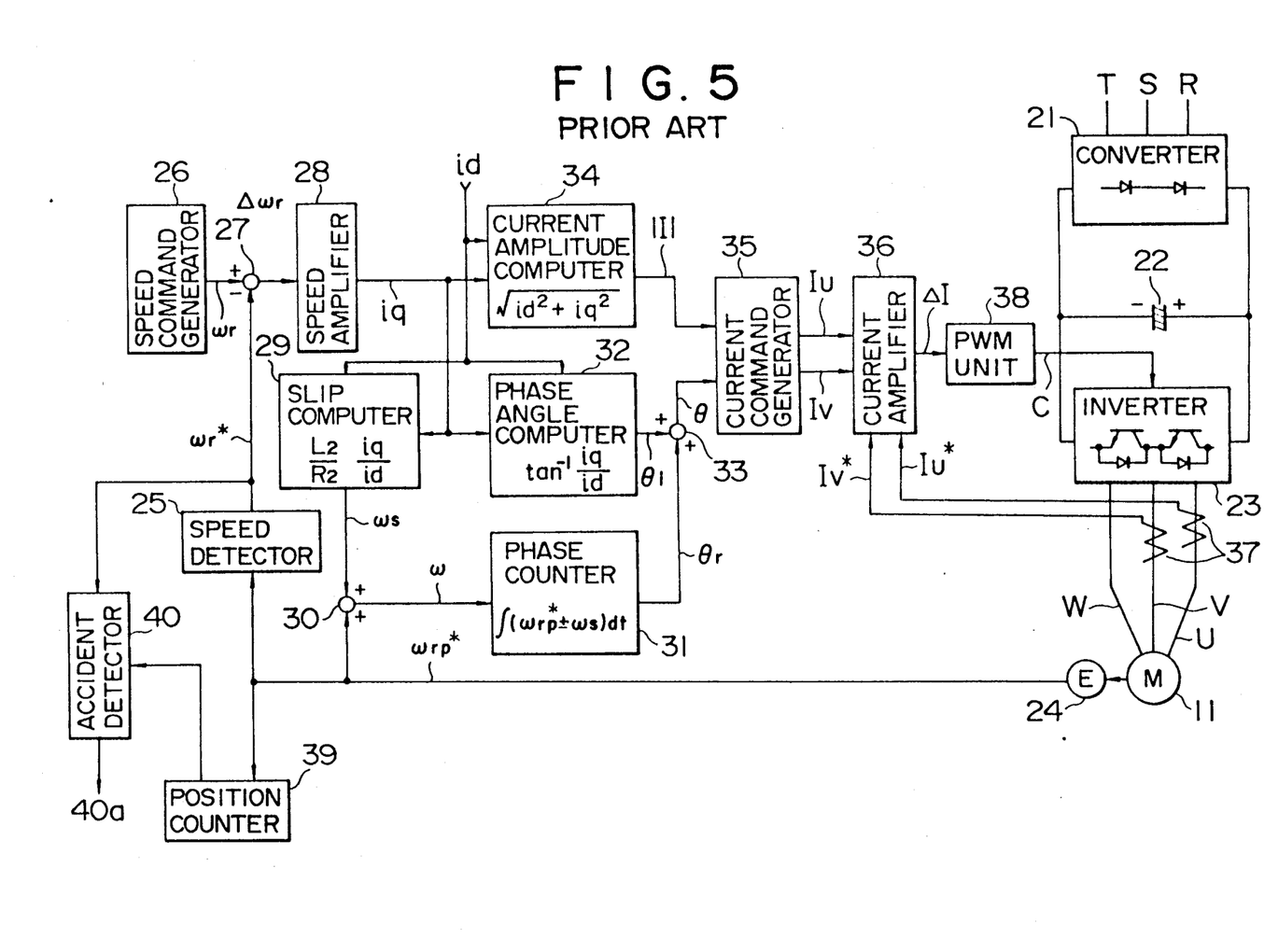
FIG. 5 is a block diagram of a conventional door control system.

FIG. 5 is a block diagram of a control system for controlling a door system having the above-described construction. Referring to this figure, the control system includes a converter 21 for rectifying three-phase A.C. power of R, S and T phases, a smoothing capacitor 22 for smoothing the output of the converter 21, and an inverter 23 for receiving the smoothed output from the smoothing capacitor 22. The inverter 23 includes switching devices such as transistors, field effect transistors or the like, and is capable of converting the D.C. voltage supplied thereto into a three-phase A.C. voltage which is supplied to the electric motor 11. The switching devices receive a PWM pulse from a PWM unit 38 so as to effect pulse width modulation of the output.

The operation speed and the torque of the electric motor 11 are thus controlled by the power supplied through the inverter 23. The driving unit 10, with the controlled speed and torque, drives the car door 3 through the link mechanism 12, so that the car door 3 moves with its rollers 7, 8 rolling along the rail 5, thereby opening and closing the entrance 2.

An encoder 24 directly coupled to the electric motor 11 produces a pulse train $\omega_{rp}*$ including pulses the number of which corresponds to the angle of rotation of the rotor of the electric motor 11. The pulse train $\omega_{rp}*$ is input to a speed detector 25 which counts the number of pulses per unit time, thus computing the motor speed $\omega_r*$. Numeral 26 designates a speed command generator which generates a speed command $\omega_r$ for commanding the speed of the electric motor 11. The speed command $\omega_r$ and the speed $\omega_r*$ are added together in an adder 27 so that a speed offset $\Delta\omega_r$ is obtained. The speed offset $\Delta\omega_r$ is input to a speed amplifier 28 which generates, for example, a torque command in the form of a torque current command iq necessary for enabling the electric motor 11 to operate at the command speed $\omega_r$. The torque current command iq is delivered to a slip computing unit 29, together with an exciting current command id which is constant when the torque is constant. The slip computing unit 29 then computes a slip frequency in accordance with the following formula:

$$\omega_s = (L_2 R_2) \cdot (iq/id)$$

where $L_2$ represents the secondary reactance of the electric motor 11 (calculated on the basis of the primary side and $R_2$ represents the secondary resistance of the electric motor (calculated on the basis of the primary side).

The slip frequency $\omega_s$ and the pulse train $\omega_{rp}*$ are added together by an adder 30, the output of which is delivered to a phase counter 31 which forms an integrator. The phase counter 31 then computes the angle $\theta_r$ of rotation of the electric motor 11 in accordance with the following formula.

$$\theta_r = \int(\omega_{rp}* \pm \omega_s)dt$$

On the other hand, the torque current command iq and the exciting current command id are supplied to a phase angle computing unit 32 which determines the phase angle $\theta_i$ in accordance with the following formula.

$$\theta_i = \tan^{-1}(iq/id)$$

The phase angle $\theta_i$ and the rotation angle $\theta_r$ are added together by an adder 33 so that the actual current phase angle $\theta$ is determined as $\theta = \theta_i + \theta_r$.

The torque current command iq and the exciting current command id are input to a current amplitude computer 34 which determines the current amplitude $|I|$ in accordance with the following formula.

$$|I| = \sqrt{id^2 + iq^2}$$

The current amplitude $|I|$ and the actual current phase angle $\theta$ are input to a current command generator 35 which produces a U-phase current command IU and a V-phase current command IV as follows:

$$IU = |I| \cdot \sin \theta$$

$$IV = |I| \cdot \sin(\theta + 2\pi/3)$$

On the other hand, the currents in the U- and V-phase of the electric motor 11 are detected by a DC current transformer 37 as actual motor currents IU* and IV*. The actual motor currents IU* and IV* and the current commands IU and IV are input to a current amplifier 36 which computes offset values $\Delta IU$ and $\Delta IV$, as well as $\Delta IW = -\Delta IU - \Delta IV$, which are supplied to the PWM unit 38. The PWM unit 38 then computes a 3-phase PWM voltage command corresponding to the above-mentioned offsets as a change-over signal C which is delivered to the inverter 23. The inverter 23 then operates the switching device in accordance with the pulse train included in the change-over signal C, so as to control the currents, voltage and frequency of the power supplied to the electric motor 11, whereby the speed and the torque of the electric motor 11 are controlled.

Numeral 39 designates a position counter for counting the pulses of the pulse train $\omega_{rp}*$ from the encoder 24 so as to detect the position of the car door 3, While numeral 40 designates an accident detector for detecting a passenger caught by the car door 3 upon receipt of the signals from the position counter 39 and the speed detector 25 and for producing a reversing instruction 40a.

Figure 6:
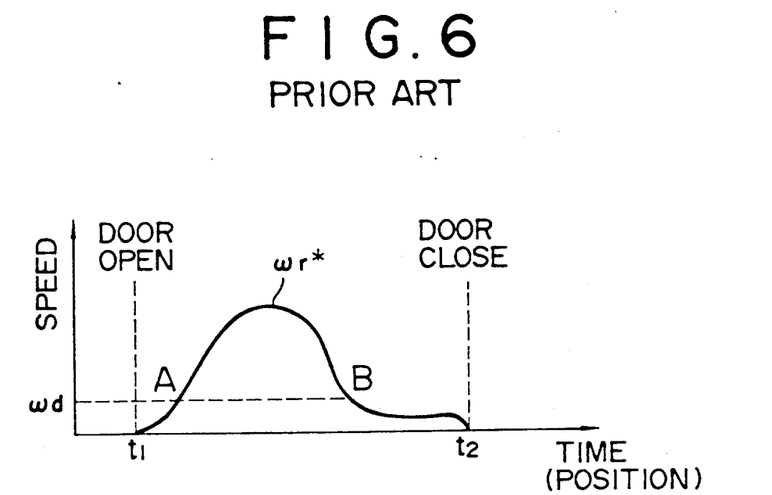
FIG. 6 is a diagram illustrating the operation of the system shown in FIG. 5.

During closing of the car door 3, the speed $\omega_r^*$ varies in relation to time in a manner shown in FIG. 6. In this Figure, $t_1$ and $t_2$ represent, respectively, the moment at which closing is commenced and the moment at which closing is ceased.

When a passenger is caught by the car door 3 during closing, the car door 3 is decelerated so that the speed $\omega_r^*$ of the motor is reduced. As this speed comes down below a predetermined speed $\omega_d$, the above-mentioned reversing instruction 40a is given to reverse the car door 3. Thus, the accident detector 40 produces the reversing instruction 40a so as to reverse the car door 3 to ensure safety when the car door position 3 detected from the output of the position counter 39 is within a region AB and it is detected that the motor speed $\theta_r^*$ is below the predetermined speed $\omega_d$.

In the known elevator door control system having the above-described construction, the reversing instruction 40a is generated when it is detected that the speed $\omega_r^*$ of the door driving motor 11 has come down below the predetermined speed $\omega_d$. However, as can be seen from FIG. 6, an obstruction of the car door is materially undetectable outside the region AB, since the speed $\omega_r^*$ of the door driving motor 11 is already low.

SUMMARY OF THE INVENTION

Accordingly, an object of the present invention is to provide a control system of an elevator car door which can detect without fail any obstruction of a car door caused by a passenger caught between the door and the edge of the entrance, even in the portion of the closing stroke of the door where the door driving motor operates at a low speed, thereby overcoming the above-described problems of the prior art.

To this end, according to the present invention, there is provided an elevator car door control system comprising torque command output means for outputting a torque command for controlling a car door driving motor on the basis of the difference between a speed command commanding the operating speed of the motor and the actual speed of operation of the motor, door position detecting means for detecting the position of the car door, memory means for storing torque limit values as a function of the car door position, and accident detecting means for reading the torque limit value corresponding to the car door position detected by the door position detecting means, comparing the read torque limit value with a torque command output from the torque command output means, and generating a reversing instruction to be given to the motor upon determining that the torque command is not smaller than the torque limit value.

DESCRIPTION OF THE PREFERRED EMBODIMENTS

Preferred embodiments of the present invention will be described hereinunder with reference to the accompanying drawings.

Figure 1:
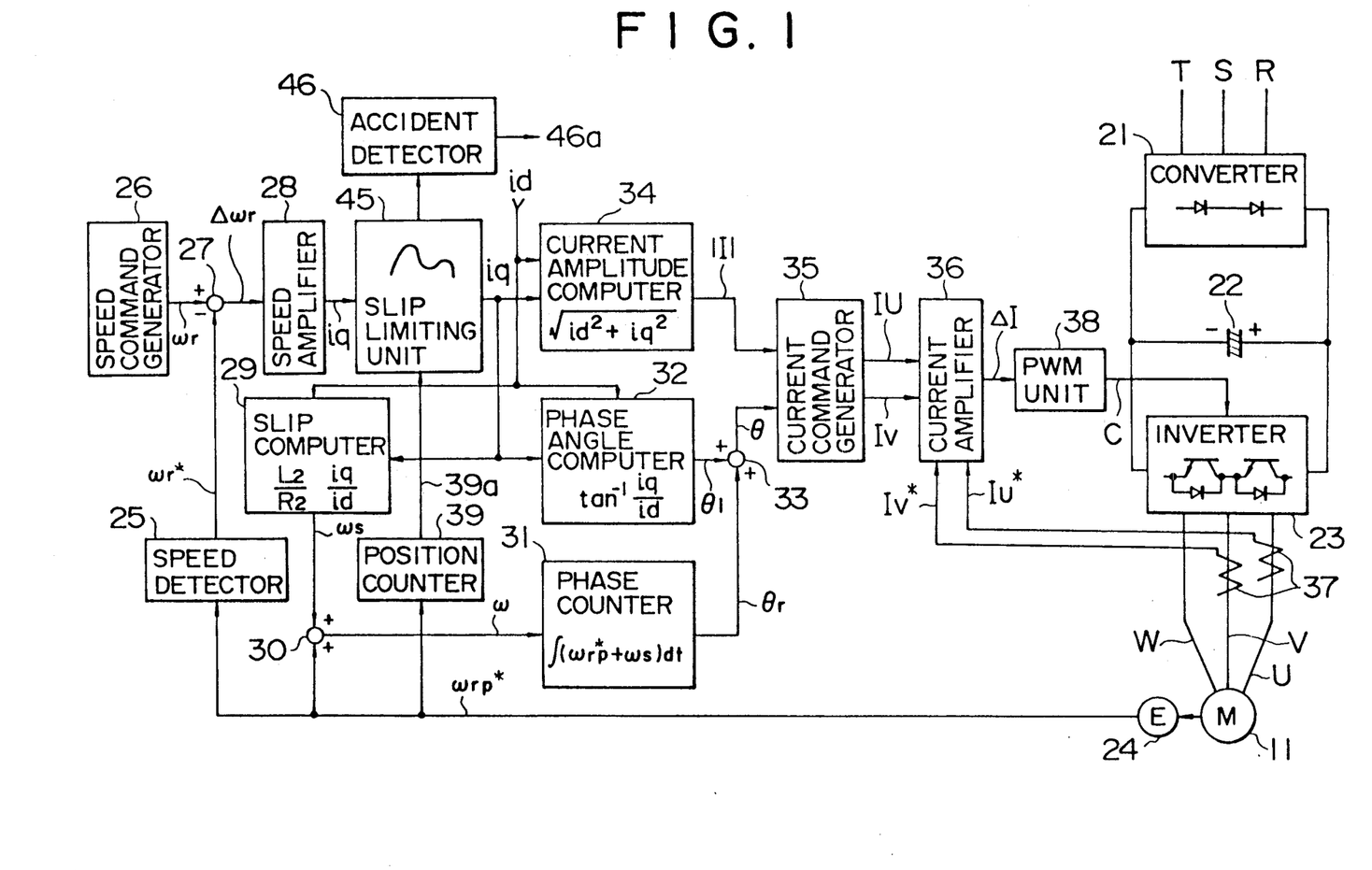
FIG. 1 is a block diagram of an embodiment of an elevator car door control system of the present invention.
Figure 2A:
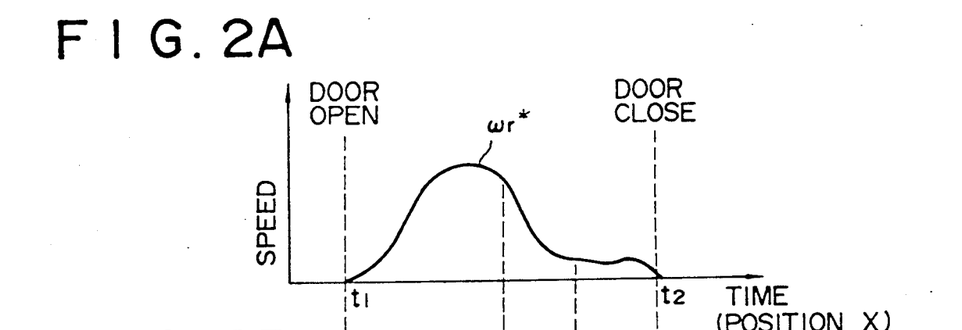
FIGS. 2A to 2C are charts showing the speed and torque of a door driving motor in the embodiment of FIG. 1.
Figures 2B, 2C:
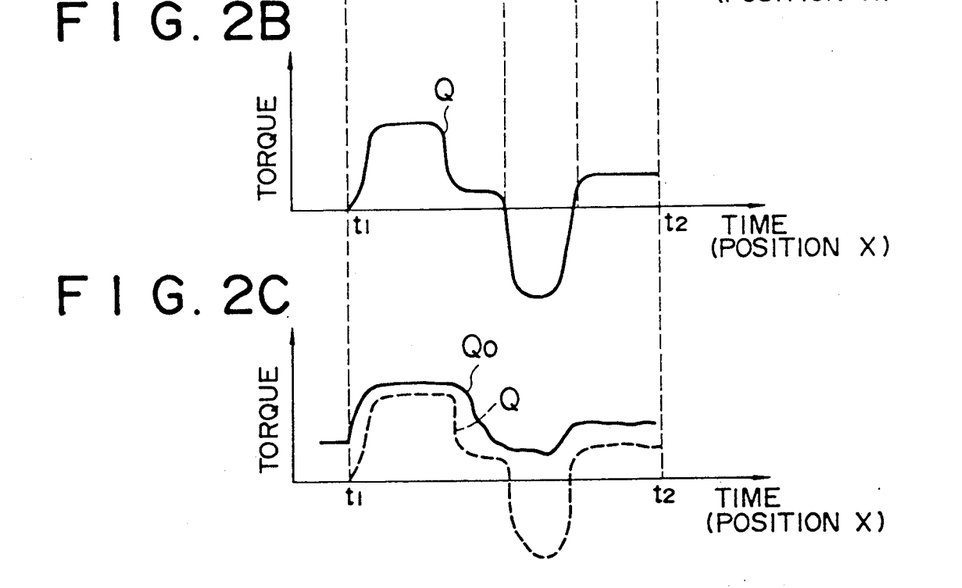

A control system for an elevator car door shown in FIG. 1 is similar to the conventional system explained before in connection with FIG. 5. In the system shown in FIG. 1, however, a slip limiting unit 45 is provided between the speed amplifier 28 and the current amplitude computer 34. In addition, an accident detector 46 in place of the accident detector 40 of FIG. 5 is connected to the slip limiting unit 45. It is also to be understood that the output of the position counter 39 is provided to the slip limiting unit 45. The slip limiting unit 45 stores therein a slip torque limit value $Q_0$ which is, as shown in FIG. 2C, a function of the car door position X which is output from the position counter 39.

Referring back to FIG. 1, the slip limiting unit 45 passes the torque current command iq from the speed amplifier 28 directly to the current amplitude computer 34, slip computer 29 and the phase angle computer 32. In addition, upon receipt of the output 39a indicative of the car door position X derived from the position counter 39, the slip limiting unit 45 reads a torque limit value $Q_0$ corresponding to the position X and computes the difference between this torque limit value $Q_0$ and a torque current command iq output from the speed amplifier 28. The slip limiting unit 45 delivers this difference to the accident detector 46. The accident detector 46 delivers a reversing instruction 46a to the electric motor 11 when the output from the slip limiting unit 45 is maintained above a predetermined level continuously for a predetermined time.

Other portions of the system are materially the same as those in the known system shown in FIG. 5, so a detailed description is omitted for such portions.

The door reversing operation of this system will be explained with reference to FIGS. 2A to 2C and FIG. 3. In general, the speed of operation $\theta_r^*$ of the electric motor 11 during closing of the car door as well as the torque command Q vary in relation to time, i.e., in relation, the car door position X in a manner shown in FIGS. 2A and 2B. The torque command Q, for example, is represented by a torque current command iq delivered by the speed amplifier 28.

Figure 3:
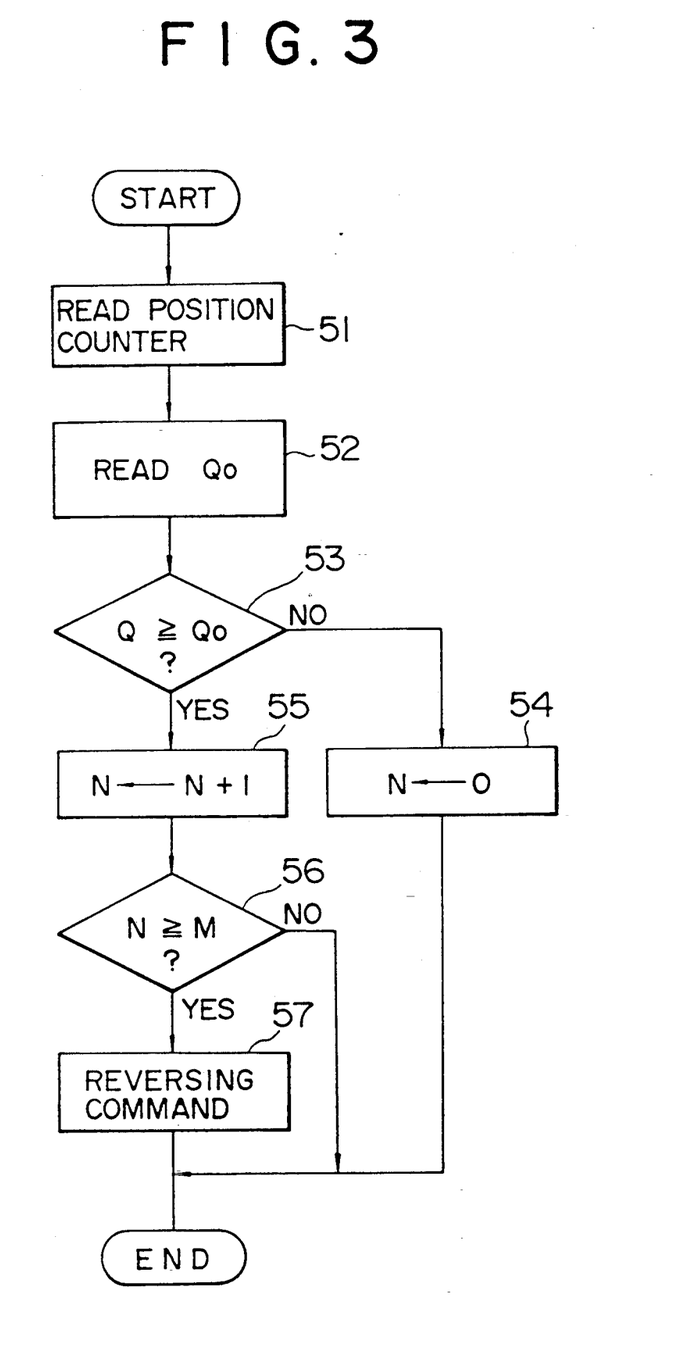
FIG. 3 is a flow chart illustrative of an operation for reversing the door in the embodiment of FIG. 1.

Referring to FIG. 3, in Step 51, the slip limiting unit 45 receives the output 39a of the position counter 39. In Step 52, the slip limiting unit 45 reads the torque limit value $Q_0$ corresponding to the output 39a of the counter 39. At the same time, the slip limiting unit 45 computes the difference between the torque limit value $Q_0$ and the present torque command Q which is represented by the torque current command iq delivered from the speed amplifier 28 and delivers this difference to the accident detector 46.

In Step 53, the accident detector 46 determines whether the present torque command Q is greater than the torque limit value $Q_0$ on the basis of the above-mentioned difference. If the torque command Q is determined to be below the torque limit value $Q_0$, the process proceeds to Step 54 in which an accident time counter (not shown) provided in the accident detector 46 is reset so as to set the count value N to 0. The operation is thus completed when no accident is detected.

On the other hand, when the torque command Q has been determined to be equal to or greater than the torque limit value $Q_0$ as a result of the determination in Step 53, the process proceeds to Step 55 in which the count value N of the accident time counter is incremented by 1. This operation is conducted when the closing movement of the car door is hindered by, for example, a passenger accidentally caught between the car door moving towards the closing position and the edge of the entrance so as to increase the torque command Q.

Then, in Step 56, it is determined whether the count value N of the accident time counter is smaller than a predetermined value M. If the count value N is below the predetermined value M, the system understands that the predetermined time has not passed from the moment at which the torque limit value $Q_0$ is exceeded by the torque command Q, thus completing a series of operation. Conversely, when the condition $N \geq M$ is satisfied in Step 56, the system judges that a predetermined time has passed from the moment at which the torque limit value $Q_0$ is exceeded by the torque command Q, so as to enable the accident detector 46 to deliver the reversing instruction 46a to the electric motor 11 in Step 57. Consequently, the car door which is being moved in the closing direction is reversed to move towards the opening position, thus releasing the passenger caught by the door.

As explained before, in the illustrated embodiment, the torque limit value $Q_0$ is beforehand stored in the slip limiting unit 45 as a function of the car door position X. It is therefore possible to finely or minutely set the value of the torque limit value $Q_0$ in accordance with the car door position X over the entire stroke of the car door. As a result, it is possible to easily detect any accident such as the trapping of a passenger even in the region where the electric motor 11 operates at a low speed.

Although the invention has been described with specific reference to the case where an accident has occurred when the car door is moving in the closing direction, this is only illustrative and the invention may be modified to reverse the door during opening movement of the car door. Such a modification is effective when, for example, a hand of a passenger has been caught between the door moving towards the opening position and a wall.

The slip limiting unit 45 and the accident detector 46 may be constructed by a microcomputer. In such a case, the algorithm for realizing the reversing of the door explained in connection with FIG. 3 can be executed by software. The torque limit value $Q_0$ stored in the slip limiting unit 45 can be stored in the form of a data table in a memory of the microcomputer.

What is claimed is:

1. An elevator car door control system comprising:
   torque command output means for outputting a torque command for controlling a car door driving motor on the basis of a difference between a speed command commanding the operation speed of said motor and the actual speed of operation of said motor;
   door position detecting means for detecting the position of the car door;
   memory means for storing torque limit values in relation to the car door position; and
   accident detecting means for reading the torque limit value corresponding to the car door position detected by said door position detecting means, comparing the read torque limit value with a torque command output from said torque command output means, and generating a reversing instruction to be given to said motor upon determining that said torque command is not smaller than said torque limit value.

2. An elevator car door control system according to claim 1, wherein said accident detecting means produces said reversing instruction only when said torque command is maintained equal to or greater than said torque limit value continuously for a predetermined time.

3. An elevator car door control system according to claim 1, wherein said door position detecting means includes an encoder for outputting a pulse train proportional to the angle of rotation of the rotor of said motor, and a counter for counting the number of pulses of said pulse train.

4. An elevator car door control system according to claim 1, wherein said memory means stores the torque limit values corresponding to different positions of the door over the entire stroke of movement of said door driven by said motor.

5. An elevator car door control system according to claim 4, wherein said memory means stores the torque limit values as a function of the door position.

6. An elevator car door control system according to claim 1, wherein said accident detecting means includes a microcomputer.

7. A control system for a door of an elevator car comprising:
   position detecting means for detecting the position of a door of an elevator car;
   torque command generating means for generating a torque command;
   a motor responsive to the torque command generating means and drivingly connected to the door for moving the door between an open and a closed position in response to the torque command;
   torque limit determining means for determining a torque limit corresponding to the position detected by the position detecting means;
   obstruction detecting means for detecting an obstruction of the door by comparing the torque limit determined by the torque limit determining means with the torque command generated by the torque command generating means; and
   motor reversing means for reversing the direction of rotation of the motor when the obstruction detecting means detects an obstruction.

8. An apparatus as claimed in claim 7 wherein the obstruction detecting means comprises means for detecting an obstruction when the torque command is greater than the torque limit.

9. An apparatus as claimed in claim 8 wherein the obstruction detecting means comprises means for detecting an obstruction when the torque command is greater than the torque limit for a prescribed length of time.

10. An apparatus as claimed in claim 7 wherein the torque limit varies with the position of the door between the open and closed positions.

11. An apparatus as claimed in claim 7 further comprising:

speed command generating means for generating a speed command indicative of a desired speed of the motor; and speed sensing means for sensing the actual speed of the motor, wherein the torque command generating means comprises means for generating the torque command based on the difference between the desired speed indicated by the speed command and the actual motor speed sensed by the speed sensing means.

* * * * *